United States Patent
Tang et al.

(10) Patent No.: US 7,159,207 B2
(45) Date of Patent: Jan. 2, 2007

(54) METHOD AND APPARATUS FOR ACCESSING RELATED COMPUTER OBJECTS

(75) Inventors: John C. Tang, Palo Alto, CA (US); Donald R. Gentner, Palo Alto, CA (US); Nicole Y. Mordecai, Weston, MA (US); James M. A. Begole, Mountain View, CA (US); Michael L. Van De Vanter, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 678 days.

(21) Appl. No.: 09/829,597

(22) Filed: Apr. 9, 2001

(65) Prior Publication Data

US 2004/0015854 A1    Jan. 22, 2004

(51) Int. Cl.
*G06F 9/44*        (2006.01)
*G06F 3/00*        (2006.01)
(52) U.S. Cl. .................................. 717/109; 715/809
(58) Field of Classification Search ........ 717/106–109; 711/116; 715/511, 751–759, 804, 810, 835; 707/6
See application file for complete search history.

(56) References Cited

U.S. PATENT DOCUMENTS

| | | | | |
|---|---|---|---|---|
| 3,893,084 A | * | 7/1975 | Kotok et al. | 711/166 |
| 5,446,895 A | * | 8/1995 | White et al. | 717/101 |
| 5,490,097 A | * | 2/1996 | Swenson et al. | 703/2 |
| 5,781,732 A | * | 7/1998 | Adams | 709/205 |
| 5,832,494 A | * | 11/1998 | Egger et al. | 707/102 |
| 5,848,394 A | * | 12/1998 | D'Arrigo et al. | 705/8 |
| 5,960,196 A | * | 9/1999 | Carrier et al. | 717/122 |
| 5,991,799 A | * | 11/1999 | Yen et al. | 709/218 |
| 6,014,135 A | * | 1/2000 | Fernandes | 715/744 |
| 6,212,534 B1 | * | 4/2001 | Lo et al. | 715/511 |
| 6,349,327 B1 | * | 2/2002 | Tang et al. | 709/205 |

(Continued)

OTHER PUBLICATIONS

Baker,N, Bazan, A, Ghevenier, G, Estrella, et al, "An Object Model for Product and Workflow Data Management", Database an Expert Systems Applications, 1998, Proceedings, Ninth Int'l Workshop, Aug. 26-28, 1998, p. 731-738, retrieved from IEEE Jun. 23, 2004.*

(Continued)

*Primary Examiner*—Mary J. Steelman
(74) *Attorney, Agent, or Firm*—Martine Penilla & Gencarella, LLP (57) ABSTRACT

The present invention provides a method and apparatus for accessing related computer objects. In one embodiment, computer objects related to a user's current task by a metric are listed. In another embodiment, other users related to a user's current task by a metric are listed. In one embodiment, the metric used to determine whether a user is related to a computer object determines whether the user accessed the computer object. In another embodiment, the metric used to determine whether a user is related to a computer object determines whether the user is referenced in the computer object. In other embodiments, the metric used to determine whether a user is related to a computer object involves other measures of relatedness. In one embodiment, the metric used to determine whether a computer object is related to another computer object determines whether the computer objects have a related user in common.

17 Claims, 9 Drawing Sheets

U.S. PATENT DOCUMENTS

| | | | | |
|---|---|---|---|---|
| 6,425,016 B1 * | 7/2002 | Banavar et al. | 719/310 |
| 6,426,761 B1 * | 7/2002 | Kanevsky et al. | 715/788 |
| 6,507,845 B1 * | 1/2003 | Cohen et al. | 707/100 |
| 6,519,763 B1 * | 2/2003 | Kaufer et al. | 717/101 |
| 6,643,661 B1 * | 11/2003 | Polizzi et al. | 707/100 |
| 6,658,643 B1 * | 12/2003 | Bera | 717/101 |
| 6,678,882 B1 * | 1/2004 | Hurley et al. | 717/121 |
| 6,795,826 B1 * | 9/2004 | Flinn et al. | 707/100 |
| 6,901,448 B1 * | 5/2005 | Zhu et al. | 709/228 |
| 6,993,723 B1 * | 1/2006 | Danielsen et al. | 715/751 |
| 2005/0022132 A1 * | 1/2005 | Herzberg et al. | 715/759 |

OTHER PUBLICATIONS

Grundy, John C., Mugridge, Warwick B., Hosking, John G., Amor, Robert W., "Support for Collaborative, Integrated Software Development", p. 84-94, IEEE 1995, retrieved Jun. 23, 2004.*

Lee, Byong G., Chang, Kai H., Narayanan, N. Hari, "An Integrated Approach to Version Control Management in Computer Supported Collaborative Writing", p. 34-43, ACM 1998, retrieved Jun. 23, 2004.*

Prakash, Atul, Shim, Hyong Sop, DistView: Support for Building Efficient Collaborative Applications using Replicated Opbects p. 153-164, ACM 1994, retrieved Jun. 23, 2004.*

* cited by examiner

METHOD AND APPARATUS FOR ACCESSING RELATED COMPUTER OBJECTS

BACKGROUND OF THE INVENTION

1. Field of the Invention

The present invention relates to the field of computer software, and in particular to a method and apparatus for accessing related computer objects.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

A user of a computer system typically operates on multiple computer objects over the course of time. Some examples of computer objects are documents, calendar entries, web pages, spreadsheets, other users' contact information and e-mail messages. Frequently, a computer object is related in some manner to other computer objects such that a user using the computer object is likely to wish to access the related computer objects as well. Additionally, a computer object is also frequently related to users such that a user using the computer object is likely to wish to access, or communicate with, the related users. Current schemes for accessing related computer objects and users are inefficient. This problem can be better understood by a review of accessing computer objects and users.

Accessing Computer Objects

Computer objects contain information users wish to access. E-mail messages, word processing documents, spreadsheet documents, calendar appointments, web pages and electronic voice messages are examples of computer objects, but generally a computer object refers to any collection of data in a computer system that is organized in some manner and is useful to a person. Users wishing to access a computer object typically must search through a file system hierarchy to locate the computer objects. For example, in one computer environment, assume a user wishes to open a computer object named "document1." If "document1" is not presently available to the user, the user might open a "documents" folder which might contain a "project" folder. Inside the "project" folder might be a "letters" folder, and inside the "letters" folder might be "document1."

The above method of accessing a computer object involves many actions by the user which is disadvantageous. One method which circumvents the need to search through the file system hierarchy for a computer object is to manually enter the computer object's location in the file system hierarchy. In the example above, the user might type "/documents/project/letters/document1" into a dialog box, causing the computer object to be opened. However, if the user is unaware of the desired computer object's location in the file system hierarchy, this method is not useful.

Another option available to a user is to allow the computer to automatically search for the computer object in the file system hierarchy. For instance, a user might type "document1" into a search dialog. The computer locates all computer objects by that name and presents them to the user. The user is then able to open the desired computer object by selecting it from the computer objects returned by the search. However, since the above method locates all computer objects that meet the search criteria, the user may be presented with a large list of potential computer objects and might be unaware which of the presented computer objects is the desired computer object.

SUMMARY OF THE INVENTION

The present invention provides a method and apparatus for accessing related computer objects. In one embodiment of the present invention, computer objects related to a user's current task by a metric are listed. In this embodiment, the user accesses related computer objects by selecting them from the related computer objects list. In another embodiment, other users related to a user's current task by a metric are listed. In this embodiment, the user accesses, or contacts, a related user by selecting the related user from the related user list.

In one embodiment of the present invention, the metric used to determine whether a user is related to a computer object determines whether the user accessed the computer object. In another embodiment, the metric used to determine whether a user is related to a computer object determines whether the user is referenced in the computer object. In other embodiments, the metric used to determine whether a user is related to a computer object involves other measures of relatedness.

In one embodiment of the present invention, the metric used to determine whether a computer object is related to another computer object determines whether the computer objects have a related user in common. In another embodiment, the metric used to determine whether a computer object is related to another computer object determines whether the computer objects have content in common. In another embodiment, the metric used to determine whether a computer object is related to another computer object determines whether the computer objects are accessed by the same group of users. In one embodiment, the frequency with which a user or a group of users accesses two computer objects is used to determine whether the two computer objects are related. In one embodiment, the metric used to determine whether a computer object is related to another computer object determines whether the two computer objects are, with some frequency level, accessed within a period of time by one or more users.

In another embodiment, the metric used to determine whether a computer object is related to another computer object determines whether one computer object is a copy of the other computer object. In another embodiment, the metric used to determine whether a computer object is related to another computer object determines whether one computer object is a template and the other computer object is derived from that template. In another embodiment, the metric used to determine whether a computer object is related to another computer object determines whether both computer objects are derived from the same template. In other embodiments, the metric used to determine whether a computer object is related to another computer object involves other measures of relatedness.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

A method and apparatus for accessing related computer objects is described. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Related Computer Objects

In one embodiment of the present invention, computer objects related to a user's current task by a metric are listed. In this embodiment, the user accesses related computer objects by selecting them from the related computer objects list.

Figure 1:
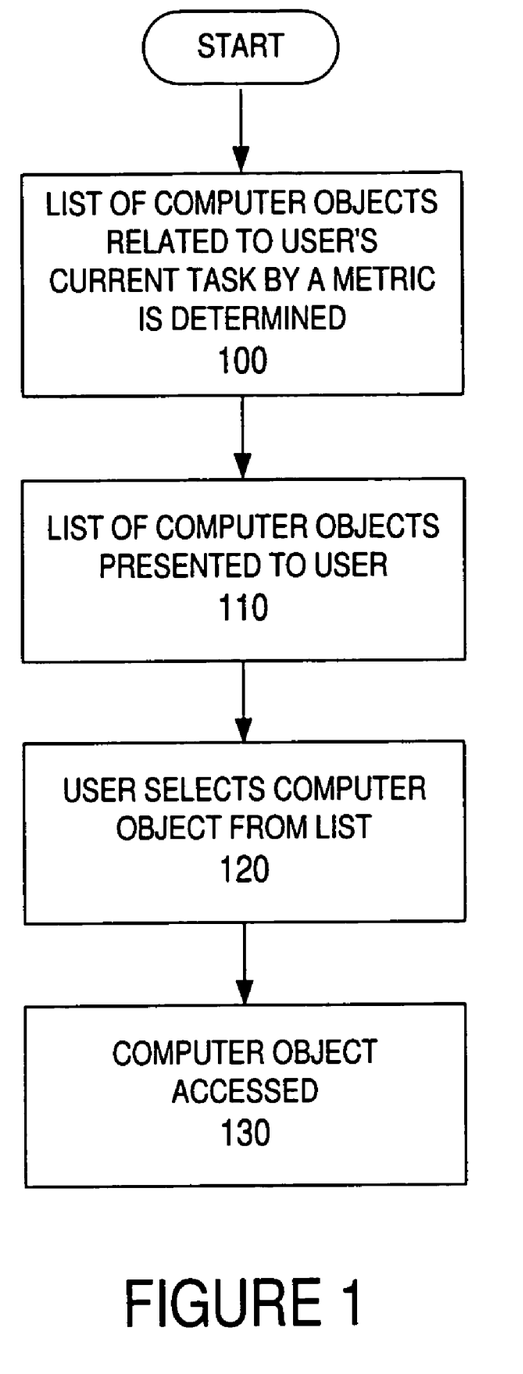
FIG. 1 is a flow diagram of the process of accessing a related computer object in accordance with one embodiment of the present invention.

FIG. 1 illustrates the process of accessing a related computer object in accordance with one embodiment of the present invention. At step 100, a list of computer objects which are related to a user's current task by a metric is determined. At step 110, the list of computer objects is presented to the user. At step 120, the user selects a computer object from the list. At step 130, the computer object is accessed.

Figure 2:
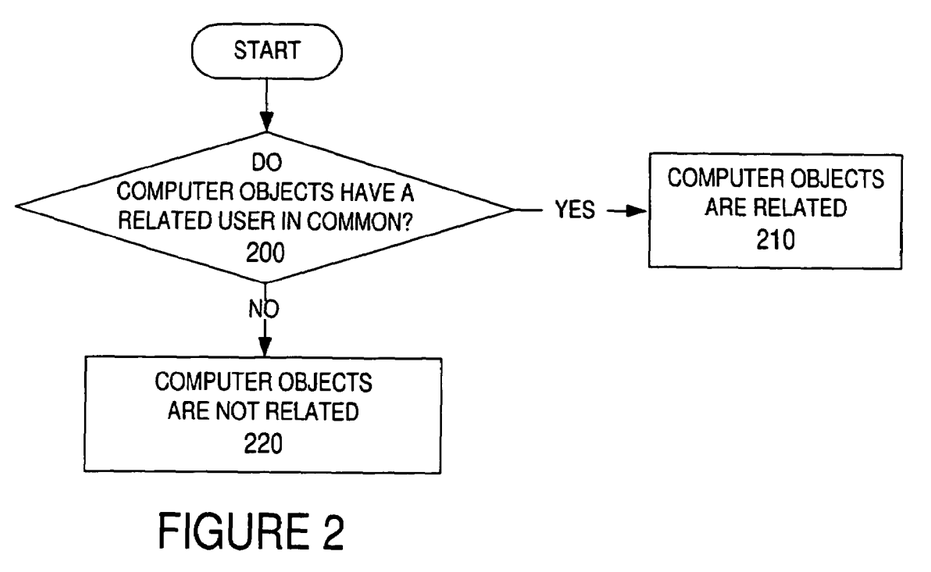
FIG. 2 is a flow diagram of the process of determining whether a computer object is related to another computer object in accordance with one embodiment of the present invention wherein objects are related if they have a user in common.

In one embodiment of the present invention, the metric used to determine whether a computer object is related to another computer object determines whether the computer objects have a related user in common. FIG. 2 illustrates the process of determining whether a computer object is related to another computer object in accordance with one embodiment of the present invention. At step 200, it is determined whether the computer objects have a related user in common. If the computer objects have a related user in common, at step 210, the computer objects are labeled as being related. If the computer objects do not have a related user in common, at step 220, the computer objects are not labeled as being related.

In one embodiment, a user is related to any computer object the user views. In another embodiment, a user is related to any computer object the user authors. In still another embodiment, a user is related to any computer object which references the user. In yet another embodiment, a user is related to any computer object which was transmitted to the user. In other embodiments, a user is related to computer objects using different metrics.

Figure 3:
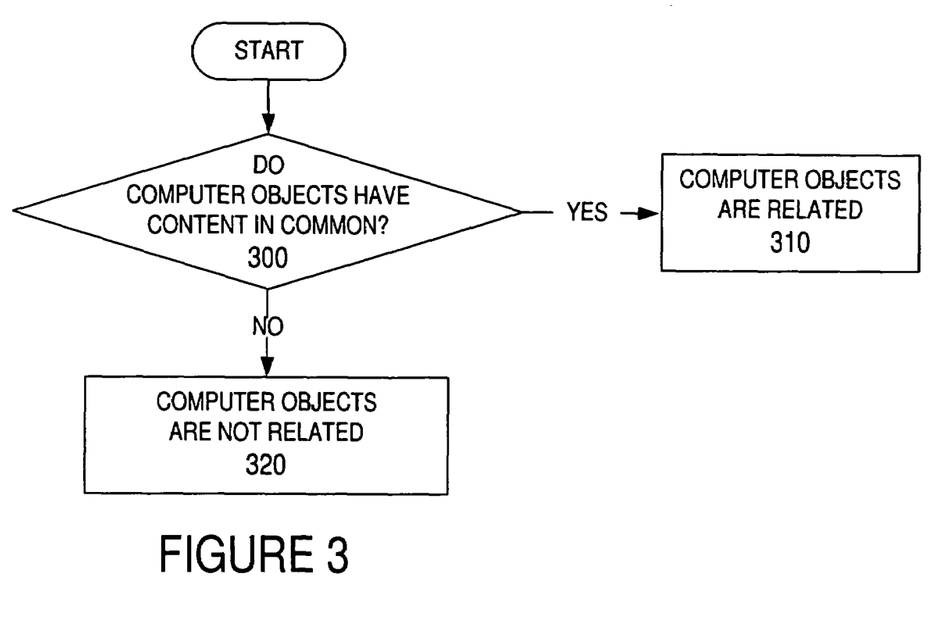
FIG. 3 is a flow diagram of the process of determining whether a computer object is related to another computer object in accordance with one embodiment of the present invention wherein objects are related if they have content in common.

In another embodiment, the metric used to determine whether a computer object is related to another computer object determines whether the computer objects have content in common. FIG. 3 illustrates the process of determining whether a computer object is related to another computer object in accordance with one embodiment of the present invention. At step 300, it is determined whether the computer objects have content in common. If the computer objects have content in common, at step 310, the computer objects are labeled as being related. If the computer objects do not have content in common, at step 320, the computer objects are not labeled as being related.

In one embodiment, the metric used to determine whether a computer object is related to another computer object determines whether the two computer objects are, with some frequency level, accessed within a period of time by one or more users. For example, in one embodiment, a drawing document is related to a text document if the two are accessed within 5 minutes of each other more than 4 times in one year. The closeness in time of the accesses and the frequency of accesses per time period can be set for the specific needs of the implementation. Thus, if members of a group of users frequently access a drawing document and the drawing's written description in a text document within a set period of time of each other, the drawing and its written description are automatically related to each other.

Figure 4:
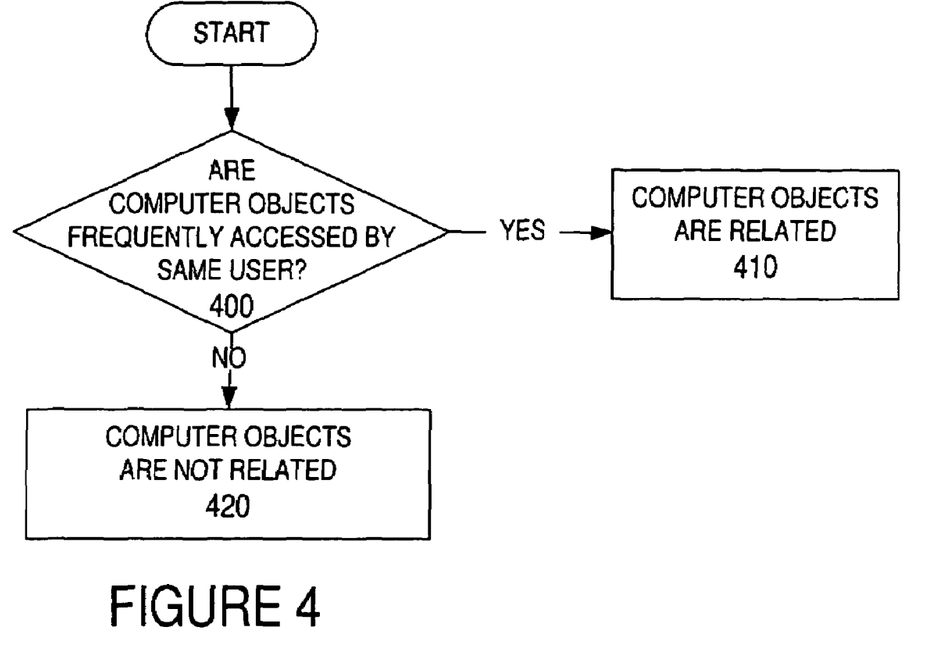
FIG. 4 is a flow diagram of the process of determining whether a computer object is related to another computer object in accordance with one embodiment of the present invention wherein objects are related if they are frequently accessed by the same user.

FIG. 4 illustrates the process of determining whether a computer object is related to another computer object in accordance with one embodiment of the present invention. At step 400, it is determined whether the computer objects are frequently accessed by the same users. If the computer objects are frequently accessed by the same users, at step 410, the computer objects are related. If the computer objects are not frequently accessed by the same users, at step 420, the computer objects are not related.

In another embodiment, the metric used to determine whether a computer object is related to another computer object determines whether one computer object is a copy of the other computer object. In another embodiment, the metric used to determine whether a computer object is related to another computer object determines whether one computer object is a template and the other computer object is derived from that template. In another embodiment, the metric used to determine whether a computer object is related to another computer object determines whether both computer objects are derived from the same template. In other embodiments, the metric used to determine whether a computer object is related to another computer object involves other measures of relatedness.

Related Users

In one embodiment of the present invention, other users related to a user's current task by a metric are listed. In this embodiment, the user accesses, or contacts, a related user by selecting the related user from the related user list.

Figure 5:
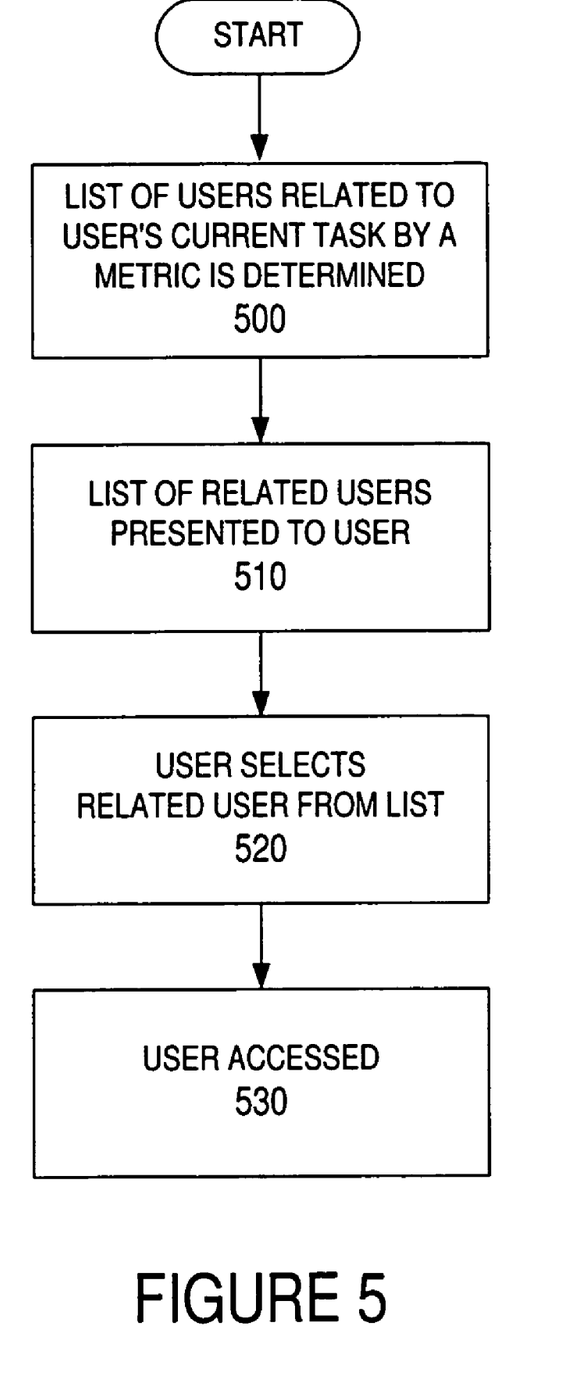
FIG. 5 is a flow diagram of the process of accessing a related user in accordance with one embodiment of the present invention.

FIG. 5 illustrates the process of accessing a related user in accordance with one embodiment of the present invention. At step 500, a list of users which are related to a user's current task by a metric is determined. At step 510, the list of users is presented to the user. At step 520, the user selects a second user from the list. At step 530, the second user is contacted.

Figure 6:
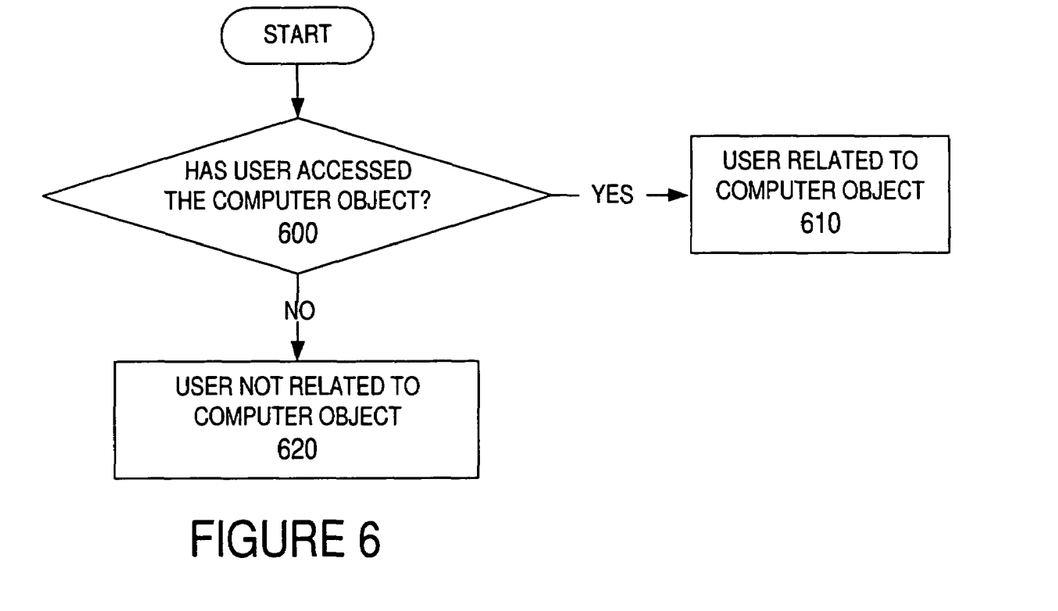
FIG. 6 is a flow diagram of the process of determining whether a user is related to a computer object in accordance with one embodiment of the present invention wherein a user is related to an object if the user has accessed the object.

In one embodiment of the present invention, the metric used to determine whether a user is related to a computer object determines whether the user accessed the computer object. FIG. 6 illustrates the process of determining whether a user is related to a computer object in accordance with one embodiment of the present invention. At step 600, it is determined whether the user has accessed the computer object. If the user has accessed the computer object, at step 610, the user is labeled as being related to the computer object. If the user has not accessed the computer object, at step 620, the user is labeled as not being related to the computer object.

In one embodiment, a user has accessed a computer object if the user has viewed the computer object. In another embodiment, a user has accessed a computer object if the user has edited the computer object. In still another embodiment, a user has accessed a computer object if the user transmits the computer object to another user. In yet another embodiment, a user has accessed a computer object if the computer object is transmitted to the user. In other embodiments, different metrics are used to determine whether a user has accessed a computer object.

Figure 7:
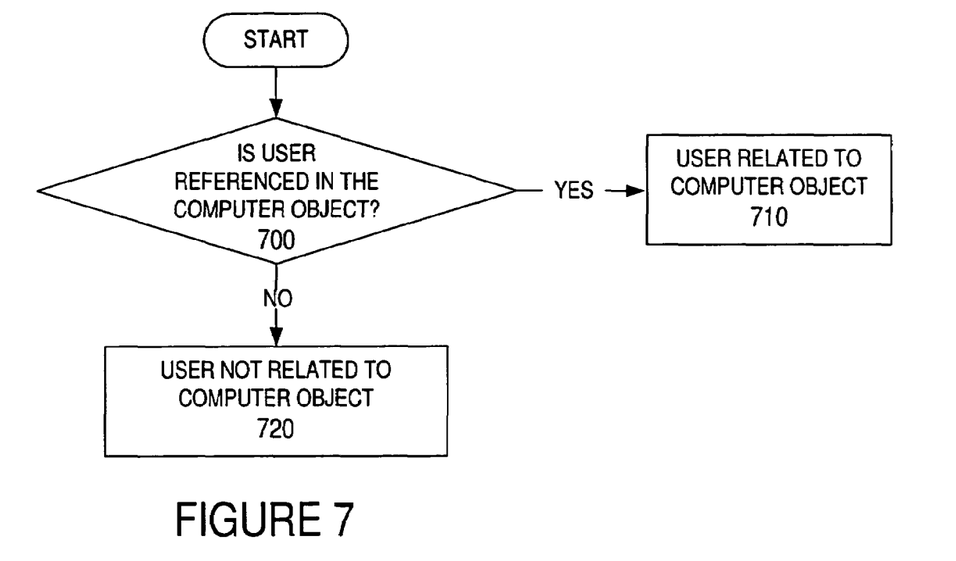
FIG. 7 is a flow diagram of the process of determining whether a user is related to a computer object in accordance with one embodiment of the present invention wherein a user is related to an object if the user is referenced in the object.

In another embodiment of the present invention, the metric used to determine whether a user is related to a computer object determines whether the user is referenced in the computer object. FIG. 7 illustrates the process of determining whether a user is related to a computer object in accordance with one embodiment of the present invention. At step 700, it is determined whether the user is referenced in the computer object. If the user is referenced in the computer object, at step 710, the user is labeled as being related to the computer object. If the user is not referenced in the computer object, at step 720, the user is not labeled as being related to the computer object.

In other embodiments of the present invention, the metric used to determine whether a user is related to a computer object involves other measures of relatedness.

Recent or Frequent Access

In one embodiment of the present invention, recently accessed computer objects are listed. In this embodiment, a user accesses a computer object by selecting it from the recently accessed computer objects list. In another embodiment, frequently contacted users are listed. In this embodiment, a user contacts a second user by selecting the second user from the frequently contacted users list. In one embodiment, the user maintains the frequently accessed users list. In another embodiment, the frequently accessed users list is automatically maintained.

In one embodiment of the present invention, the lists of related computer objects and users are displayed continuously. In another embodiment, the lists of related computer objects and users are sometimes not displayed. One embodiment of the present invention displays information about related computer objects and users. One embodiment displays a status of whether another user is accessing a computer object in the related computer objects list. Another embodiment displays the activity status of a user in the related users list. The activity status indicates, for example, whether the user is logged into the system, the user is idle for a period of time, the user sets a status message (e.g., "Away from computer for lunch") or the user is engaged in an activity.

Example Embodiment

Figure 8:
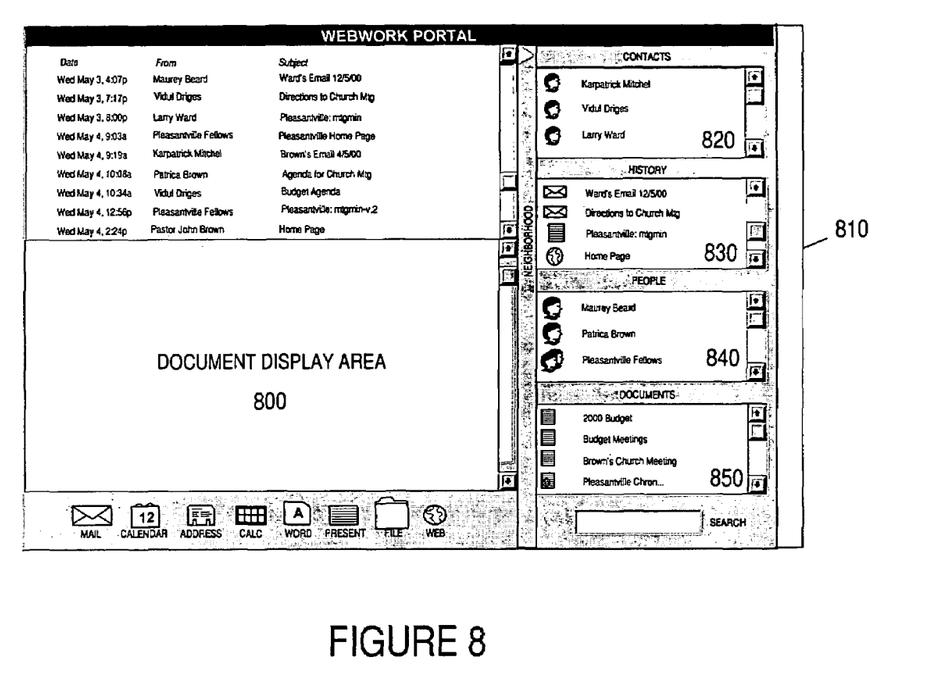
FIG. 8 is a block diagram of a document display area and neighborhood panel display in accordance with one embodiment of the present invention.

FIG. 8 illustrates a neighborhood panel and document display in accordance with one embodiment of the present invention. The document is displayed in a document display area (800). A neighborhood panel (810) is displayed to the right of the document display area. However, the neighborhood panel can also be displayed to the right, above or below the document display area. The neighborhood panel can also be displayed as a mobile window. In this embodiment, the neighborhood panel has a contacts list (820), a history list (830), a people list (840), and a documents list (850).

The contacts list is a list of other users maintained for this user as contacts. The history list is a list of documents and users recently accessed by this user. The people list is a list of other users who are related to the current document. Similarly, the documents list is a list of documents which are related to the current document.

Embodiment of Computer Execution Environment (Hardware)

Figure 9:
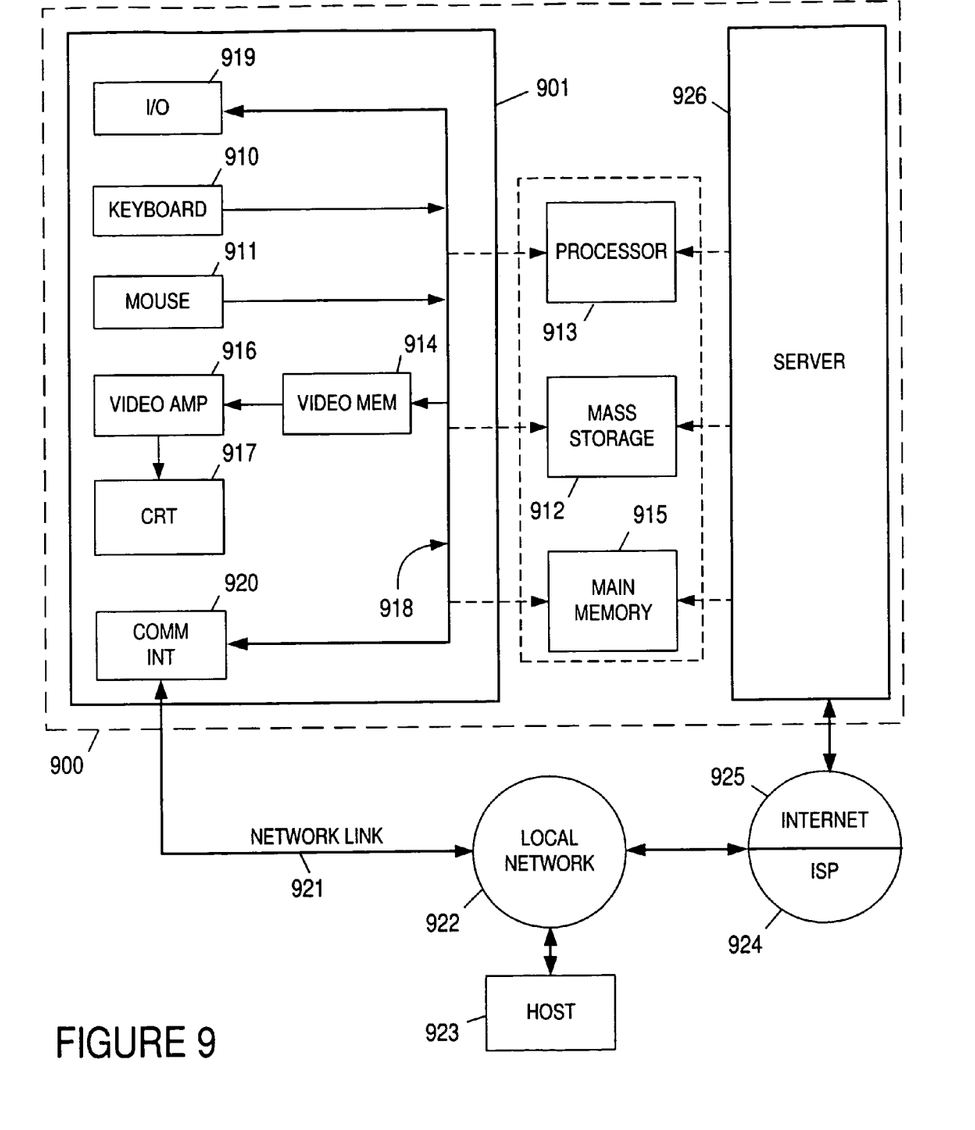
FIG. 9 is a block diagram of a general purpose computer.

An embodiment of the invention can be implemented as computer software in the form of computer readable program code executed in a general purpose computing environment such as environment 900 illustrated in FIG. 9, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 910 and mouse 911 are coupled to a system bus 918. The keyboard and mouse are for introducing user input to the computer system and communicating that user input to central processing unit (CPU) 913. Other suitable input devices may be used in addition to, or in place of, the mouse 911 and keyboard 910. I/O (input/output) unit 919 coupled to bidirectional system bus 918 represents such I/O elements as a printer, A/V (audio/video) I/O, etc.

Computer 901 may include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to local server computer 923 or to data equipment operated by ISP 924. ISP 924 in turn provides data communication services through the world wide packet data communication network now commonly referred to as the "Internet" 925. Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Processor 913 may reside wholly on client computer 901 or wholly on server 926 or processor 913 may have its computational power distributed between computer 901 and server 926. Server 926 symbolically is represented in FIG. 9 as one unit, but server 926 can also be distributed between multiple "tiers". In one embodiment, server 926 comprises a middle and back tier where application logic executes in the middle tier and persistent data is obtained in the back tier. In the case where processor 913 resides wholly on server 926, the results of the computations performed by processor 913 are transmitted to computer 901 via Internet 925, Internet Service Provider (ISP) 924, local network 922 and communication interface 920. In this way, computer 901 is able to display the results of the computation to a user in the form of output.

Computer 901 includes a video memory 914, main memory 915 and mass storage 912, all coupled to bi-directional system bus 918 along with keyboard 910, mouse 911 and processor 913. As with processor 913, in various computing environments, main memory 915 and mass storage 912, can reside wholly on server 926 or computer 901, or they may be distributed between the two. Examples of systems where processor 913, main memory 915, and mass storage 912 are distributed between computer 901 and server 926 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 912 may include both fixed and removable media, such as magnetic, optical or magnetic optical storage systems or any other available mass storage technology. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914 and mass storage 912. Alternatively, multiplex data/address lines may be used instead of separate data and address lines.

In one embodiment of the invention, the processor 913 is a SPARC microprocessor from Sun Microsystems, Inc., a microprocessor manufactured by Motorola, such as the 680X0 processor, or a microprocessor manufactured by Intel, such as the 80X86 or Pentium processor. However, any other suitable microprocessor or microcomputer may be utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and may be implemented by any suitable apparatus. This circuitry converts pixel data stored in video memory 914 to a raster signal suitable for use by monitor 917. Monitor 917 is a type of monitor suitable for displaying graphic images.

Computer 901 can send messages and receive data, including program code, through the network(s), network link 921, and communication interface 920. In the Internet example, remote server computer 926 might transmit a requested code for an application program through Internet 925, ISP 924, local network 922 and communication interface 920. The received code may be executed by processor 913 as it is received, and/or stored in mass storage 912, or other non-volatile storage for later execution. In this manner, computer 900 may obtain application code in the form of a carrier wave. Alternatively, remote server computer 926 may execute applications using processor 913, and utilize mass storage 912, and/or video memory 915. The results of the execution at server 926 are then transmitted through Internet 925, ISP 924, local network 922 and communication interface 920. In this example, computer 901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for accessing related items is described in conjunction with one or more specific embodiments. The invention is defined by the following claims and their full scope and equivalents.

The invention claimed is:

1. A graphical display interface portal tangibly embodied on a computer readable media, the graphical display interface portal providing a user interface for interactivity, comprising:

a document display area of a user interface display screen, the document display area defining a currently active program object that is executing enables program interaction by a user and displays updated results; and a neighborhood panel presented on the user interface display screen along side the document display area, such that the neighborhood panel is concurrently illustrated when the currently active program object for the user is present, the neighborhood panel including a list of one or more users and a list of one or more program objects, the list of one or more users being automatically displayed in the neighborhood panel, each user in the list of one or more users being dynamically selected for display in the neighborhood panel based on a relationship between the user and the currently active program object, the relationship being defined by a metric; and the list of one or more program objects being automatically displayed in the neighborhood panel, each program object in the list of one or more program objects being dynamically selected for display in the neighborhood panel based on a relationship between the program object and the currently active program object, the relationship being defined by a metric;

wherein automatically displaying the list of one or more users and the list of one or more program objects in neighborhood panel provides a viewable interrelationship and an accessible link to the users and program objects that are most related to the currently active program object, as defined by the metric for the users and the metric for the program objects, and wherein the accessible link to either the users or the program objects is presented as an icon, the icon providing a graphical or text indicator of a type for the accessible link.

2. A graphical display interface portal as recited in claim 1, wherein the neighborhood panel further identifies a history list, the history list defining users and program objects that the user of the currently active program object has accessed or communicated with, the history list being automatically updated and displayed on the user interface display screen.

3. A graphical display interface portal of claim 1, wherein the currently active program object is one of a word processing document, an email message, a telephone conversation, or a web page.

4. A graphical display interface portal of claim 1, wherein the metric for the users is determined by a number of times the users accessed the currently active program object in the past.

5. A graphical display interface portal of claim 1, wherein the metric for the program object is determined by an amount of common content between the currently active program object and the program object.

6. A graphical display interface portal of claim 1, wherein the metric for the program object is determined by a frequency with which the program object is accessed by one or more users.

7. A graphical display interface portal of claim 1, wherein the metric for the program object is determined by whether the program object is a copy of the currently active program object.

8. A graphical display interface portal of claim 1, wherein the metric for the program object is determined by whether the currently active program object referenced the program object.

9. A graphical display interface portal of claim 1, wherein the metric for the user is determined by whether the user has accessed the program object.

10. A graphical display interface portal of claim 1, wherein the metric for the user is determined by whether the user was contacted.

11. A computer implemented method of accessing a related item through a graphical user interface (GUI) that provides graphical access and interactivity, comprising:

displaying a currently active program object that is executing in a display area, the currently active program object allowing user interaction and displaying updated results with aspects of the active program object;

automatically generating a dynamic list of related users and program objects for the currently active program object based on a metric;

concurrently displaying the list of related users and program objects in a neighborhood panel, such that the neighborhood panel is displayed along with the currently active program object in the display area; and enabling access to at least one of the related users or programs objects through the neighborhood panel, wherein access to either the users or the program objects is enabled through an icon, the icon providing a graphical or text indicator of a type for the access.

12. A computer implemented method of accessing a related item as recited in claim 11, wherein the neighborhood panel further identifies a history list, the history list defining users and program objects that the user of the currently active program object has accessed or communicated with, the history list being automatically updated and displayed in the display area.

13. A computer implemented method of accessing a related item as recited in claim 11 wherein the currently active program object is one of a word processing document, an email message, a telephone conversation, or a web page.

14. A computer implemented method of accessing related item as recited in claim 11 further comprising:

selecting one or more users for display in the neighborhood panel based on a relationship, between the user and the currently active program object, defined by the metric.

15. A computer implemented method for accessing related item as recited in claim 11, further comprising:

determining the metric for the users by the number of times the users accessed the currently active program object in the past.

16. A computer implemented method for accessing related item as recited in claim 11, further comprising:

determining the metric for the program object by a frequency with which the program object is accessed by one or more users.

17. A computer implemented method for accessing related item as recited in claim 11, further comprising:

determining the metric for the program object by an amount of common content between the currently active program object and the program object.

* * * * *